Figure 1:
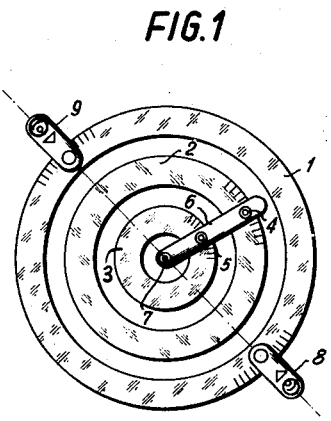

Nov. 29, 1960  F. WERNER  2,961,917
MEANS FOR EXAMINATION OF GRADUATED CIRCLES
Filed Sept. 23, 1958  3 Sheets-Sheet 1

INVENTOR
*Friedrich Werner*

By: *Samuel W. Kipnis*
Atty.

Nov. 29, 1960 F. WERNER 2,961,917
MEANS FOR EXAMINATION OF GRADUATED CIRCLES
Filed Sept. 23, 1958 3 Sheets-Sheet 3

INVENTOR
*Friedrich Werner*
By: *Samuel W. Kipnis*
*Atty.*

United States Patent Office 2,961,917
Patented Nov. 29, 1960

2,961,917

MEANS FOR EXAMINATION OF GRADUATED CIRCLES

Friedrich Werner, Berlin-Grunewald, Germany, assignor to Askania-Werke A.G., Berlin-Friedenau, Germany, a corporation of Germany Filed Sept. 23, 1958, Ser. No. 762,872

Claims priority, application Germany Sept. 23, 1957

13 Claims. (Cl. 88—14)

This invention provides for examining graduations of circles and the like, for instance during the fabrication thereof, and apparatus for performing such methods. An important field of use of circles examined in accordance with the invention is the field of theodolites, for instance for geodetic exploration.

It has long been known that the use of graduated circles and the like involves a variety of difficult problems, some of which arise due to thermal expansion and contraction of the circle, faulty centering of the circle relative to the telescopes or other instruments the positions of which are to be measured, and other conditions arising in the use of the circle. Additionally, in relatively recent times and in connection with the constant striving toward greater precision, attention has been given to sources of error lying in the circle itself and generally caused by unavoidable imperfections of the circle fabricating process. Significant, in the case of high precision instruments, are particularly the periodic and aperiodic errors in angular spacing or equivalent arrangement of graduation marks, which errors are caused by backlash and other disturbances in the graduating mechanism; some of them are widely known as "spacing errors." (Since it is generally usual, for purposes including elimination of the centering error already discussed, to read circles actually or effectively at two diametrically opposed positions, the spacing error is sometimes identified as "diametric error." It may be noted that determination of the diametric error has hitherto been practiced by means of observations simultaneously made by a plurality of observers, for instance according to a known method developed by Heuvelink.)

The time consumed by determinations of spacing errors according to known methods has been considerable, and this was so not only because of requirements of the measurements but also because of the complexity of the computations ensuing. Nor was it thus far possible, in practice, to determine spacing errors comprehensively and massively over the entire periphery of the circle; under the procedures hitherto employed the distribution of errors was covered only by spot methods and with substantial use of interpolation. No fully adequate judgment about or control of a graduating process was possible because of these shortcomings of prior methods; an unsatisfactory situation when it is considered that the circles in question must serve as fiduciary means of precision instruments, the production of which, in recent years, has been large and ever increasing.

It has therefore been the principal object of this invention to provide a possibility of avoiding the amount of labor thus far required and at the same time to obtain more complete results. Very substantial abridgment of the time requirement is desired, along with more comprehensive determination of error distributions. This was found to be possible. It was further found that, although master circles and other standards of course have imperfections of their own, it is possible without added effort to practically eliminate the effect of such imperfections by the new examining process.

Briefly, the invention provides that a pair of master circles are utilized, along with the unit to be tested. Typically that unit—the test circle—is disposed coaxially with and rigidly secured to a first master circle and rotated therewith; there being provided also, coaxially therewith, a second stationary master circle and a movable, optical, electrical or similar feeler unit, said feeler unit continuously rotating relative to the two master circles, for generating a succession of electrical impulses and for thereby providing possibilities of test comparison by phase determinations relative to such impulses.

Figure 3:
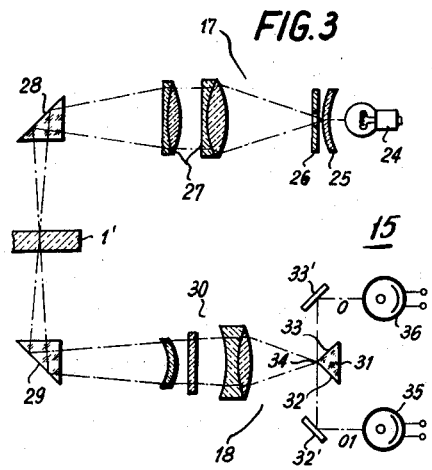
Figure 3A:
Figure 3A:
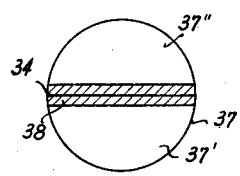
Figure 3B:
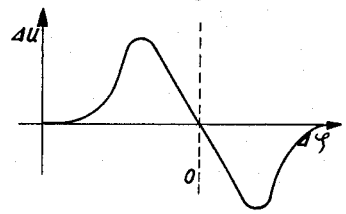
Figure 4:
Figure 4:
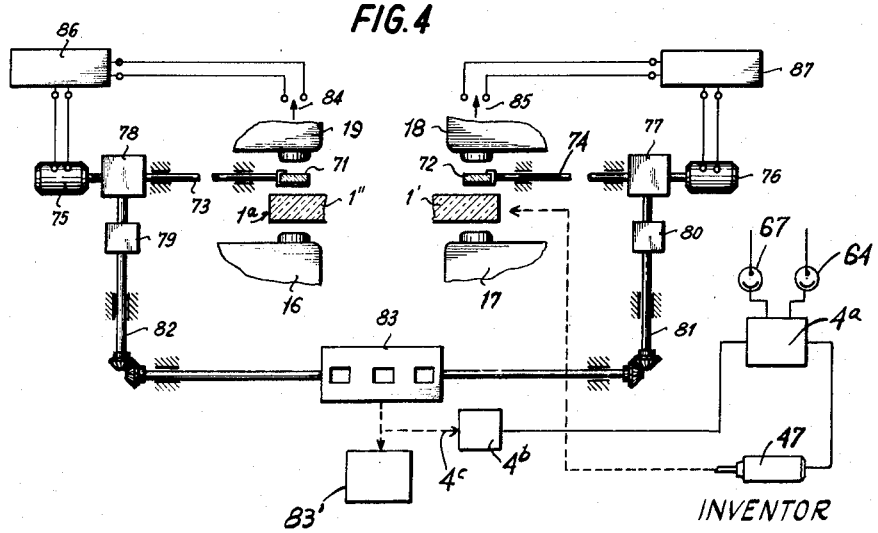
Figure 2:
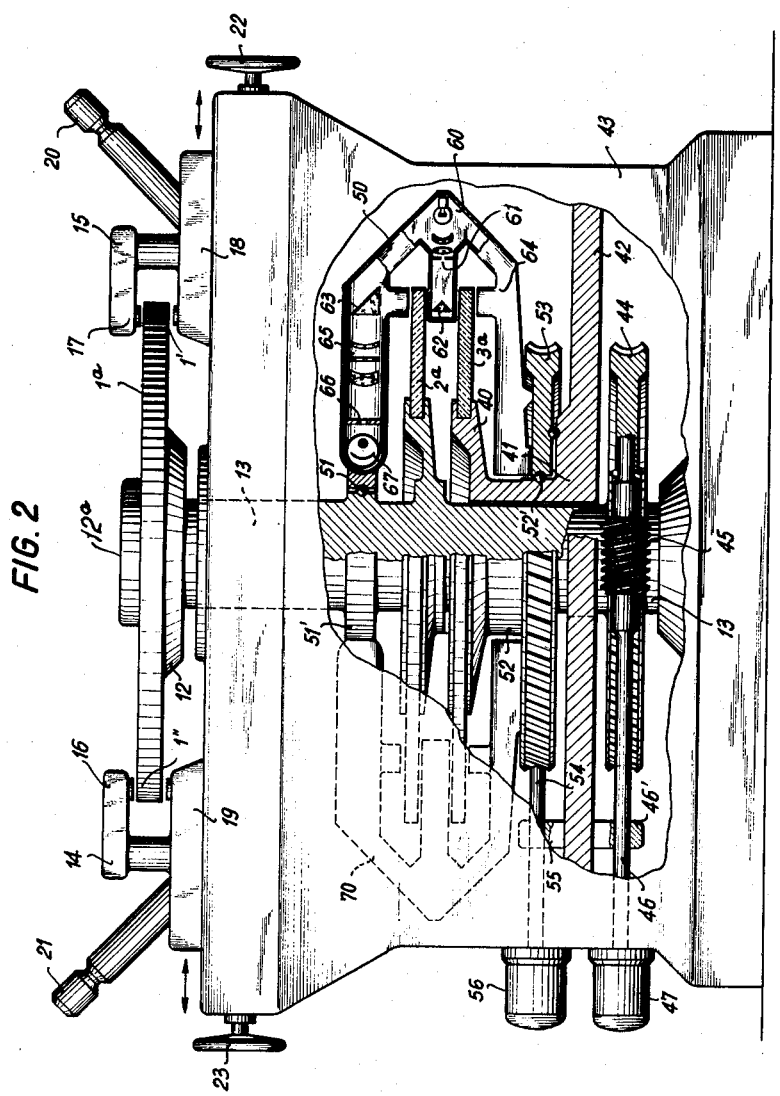
Figure 5:
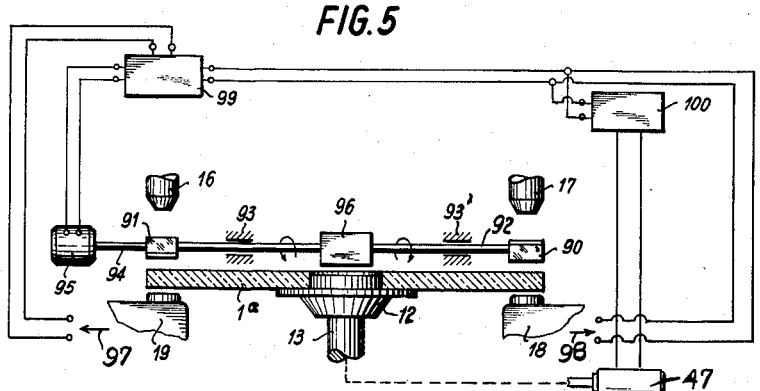
Figure 6:
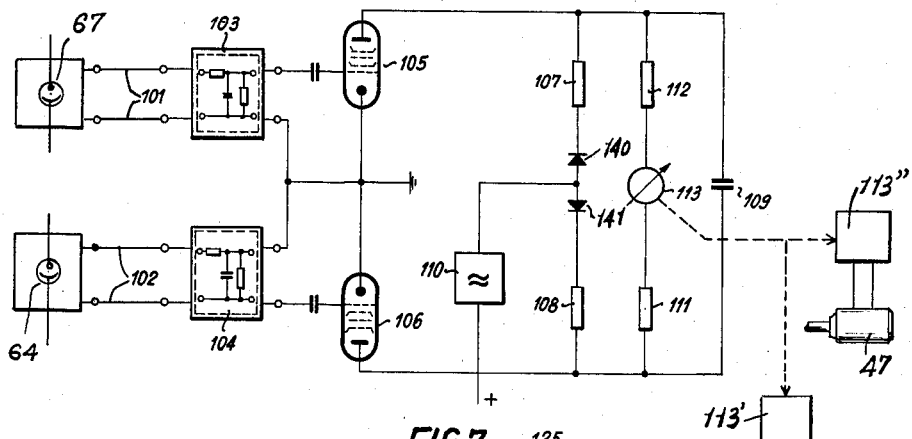
Figure 7:
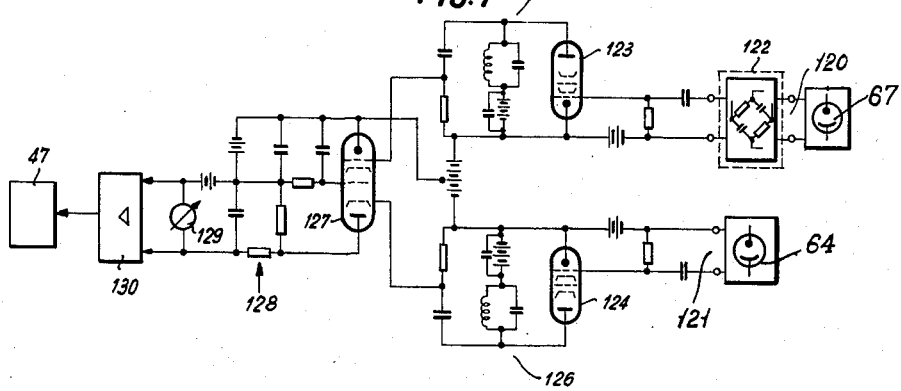

For a more detailed explanation of the invention preferred embodiments will now be described with reference to the drawing; wherein: Figure 1 is a schematic view of elements which may be used in the performance of the new methods. Figure 2 is a vertical central section through a preferred type of the new apparatus; Figure 3 is a schematic view of an optical system in such apparatus; Figure 3A shows the appearance of a filed of view in such system; Figure 3B is a graph showing an interrelation of optical and electrical values utilized in the new method and apparatus; and Figure 4 is a diagram showing electro-mechanical connections of parts of the new apparatus. Figure 5 is a modification of said diagram. Figure 6 is a detail from Figure 4, showing phase comparing circuitry more fully; and Figure 7 is a modification of Figure 6.

Figure 1 shows three concentric, annular division carriers or circles 1, 2 and 3. It will be assumed that this system of circles is transparent and illuminated from the back. It is further assumed that test circle 1 and first master circle 2 are rigidly secured to or moved with one another by any desired means or operations and that they are identically rotated relative to the second, substantially identical master circle 3, which is held stationary. Each master circle 2 and 3 is furthermore in continual motion relative to a pair of rigidly interconnected light sensitive test devices 4 and 5, creating electrical impulses, for instance by photocells, when the graduation marks of the circles pass the test devices. For this purpose test devices 4 and 5 are rigidly interconnected by a member 6 and are rotated by a shaft 7 concentric with the three circles. Desirably the rotation of shaft 7 is continuous, uniform and moderately rapid, so as to pass devices 4 and 5 over the graduation marks of circles 2 and 3 at a rate adequate for the derivation of practically usable impulses. Such impulses are accordingly available at the output of devices 4 and 5, each individual pulse corresponding to the passage of a graduation mark relative to one of the testing devices.

In other words, the geometrical distance between two division marks on each master circle is converted into the distance in time between two impulses. In view of the uniformity of master circles 2 and 3 the pulses generated at 4 and 5 have equal frequency; but because of relocations of movable master circle 2, together with test circle 1, these pulses from circles 2 and 3 are subject to phase differences. Measurement of the phase shift by means of a phase indicator or the like, not shown at this point, provides an indirect determination of the relative positions of the circles and graduations.

The test circle 1 is read by microscope means 8 and 9, disposed opposite the divisions of said circle; it being preferred to use two such microscopes at diametrically opposite positions, for reasons to be explained presently. First however it should be noted that the phase comparison required for the testing operation is advantageously performed in such a way that phase differences between the individual pulses of each pulse train, from test devices 4 and 5, are averaged, for instance over a complete revolution of the testing device, and that the average time distance of pulses is utilized for phase comparison. This procedure eliminates the spacing errors of the individual graduation marks of the two master circles from the method of testing the test circle, thereby substantially improving the operation. In addition centering errors of the three systems movable relative to one another are eliminated in this way.

Aside from the basic procedures thus far described the testing of the test circle can be performed in different ways. A first method of performing it is as follows. Test circle 1 together with primary master circle 2 is angularly repositioned from one zero indication of the phase comparison device to another such indication, whereby coincidence positions are determined on circle 1, the intervals of which are uniform, except for errors in phase measurement. Said coincidence positions of test circle 1 however, due to the graduating error, do not coincide with the marks read in reading microscopes 8 and 9; they are spaced therefrom by distances which can be determined at zero indication of the phase comparison device by micrometers (not shown), combined with microscopes 8 and 9. The micrometers of microscopes 8 and 9 respectively show spacings $d01$ and $d02$ between coincidence positions and actual, microscopic mark readings. When a suitable number $n$ of readings is taken (dependent on the spacing between coincidence positions and the number of markings therebetween) corresponding distances may be noted, the corresponding spacings at mark $n$ being designated as $dn1$ and $dn2$. The sums of such distances at each reading may be designated as $d0$, $d1$, or $dn$, etc. Calculation will show that the difference between the sum $dn$ of distances determined at reading $n$ on the one hand and the first measured sum of distances $d0$ on the other hand is proportional to the spacing error of markings $n$ on circle 1.

In another method of testing circle 1, the fundamental operations are the same as described above, but circles 1 and 2 are jointly repositioned relative to circle 3 by such angular amounts that the sum of distances between coincidence positions and actual markings under microscopes 8 and 9 is always zero. In this case the pulses generated by units 4 and 5 show a phase difference which is proportional to the diametrical error of the pair of markings under observation.

It will be noted that an expedient such as the use of two microscopes 8 and 9, or equivalent, is important for the invention, mainly in the case of the second testing method above described, and that according to each method the utilization of the two readings differs substantially from the utilization of a pair of readings in the conventional use or testing of graduated circles. The two methods described have different advantages and drawbacks, as will be explained more fully hereinafter, but it may be noted at this point that both of them are capable of giving accurate, rapid and comprehensive determinations of graduating errors.

Both methods are also capable of automatic use, by means of suitable instrumentation. Such instrumentation will now be described, with reference to Figure 2. In this figure a test circle 1a is shown at the top of the instrument and resting on a turntable 12, movable with a vertical shaft 13. Instead of the narrow annular circle hitherto considered this figure shows the usual glass circle of appreciable width relative to the central mounting member 12A. Graduating marks, not shown in this figure, are formed in a peripheral portion of the circle. Marks of different widths are used in different circles, sometimes amounting to several microns; and the errors in spacing of such marks are sometimes of the order of fractional microns.

In lieu of the relatively elementary reading devices thus far considered, reading microscope units 14 and 15 are shown in Figure 2, together with means for automatic positioning of test circle marks relative to reading indices. The said microscopes comprise illuminating devices 16, 17 and photometric devices 18, 19. For purposes such as initially adjusting circle 1a, reading devices 14, 15 are also provided with instruments 20, 21 for visual observation of the circle; however this latter apparatus 20, 21 is of no great importance for the machine and its normal use as described hereinafter. In order to adapt the machine to work on circles of different diameter the devices 14 and 15 can be radially shifted, by operating hand wheels 22 and 23, the shift being in the direction of the arrows.

A schematic view of instrument 15 appears in the schematic section of Figure 3, and Figure 3A shows the field of view, visible in observing device 21. The observed portion 1' of test circle 1a is subjected to homogeneous illumination. For this purpose instrument 15 comprises light source 24, condenser 25, point aperture member 26 and optical system 27. This latter system directs the light flux from the point aperture onto prism 28. It will be understood that parts 24 to 28 are disposed in illuminator casing 17. Prism 28 deflects the light onto circle portion 1' where such light homogeneously illuminates a mark area, thereby creating an illuminated image field 37, in observing device 21. The image 38 of a graduation mark in this field is brought via prism 29 and condenser system 30 to an optical image splitter element 31, formed by a prismatic body with reflecting surfaces 32, 33 which cooperate with their common edge 34 to divide image field 37 into two parts and to bring the same, via reflectors 32', 33' respectively, to photosensitive elements 35, 36 utilizing for instance semi-conductor materials as is well known to the art. Thus field of view 37 is divided into a pair of half images 37', 37'', and corresponding light streams 0 and 01 are conducted to elements 35, 36. The image dividing edge 34 of each reading device 14, 15 lies parallel to a diameter of test circle 1a, which diameter is normal to the common axis of devices 14, 15, and said edge serves as a reading index in image 37. Photosensitive elements 35, 36 form parts of a differential circuit, known by itself, as will be described hereinafter. They furnish a zero differential voltage when the optical center of gravity of dividing mark image 38, as shown in Figure 3A, coincides with image-separating edge 34. At other times elements 35, 36 furnish a differential voltage $\Delta U$.

Figure 3B shows a relationship between the differential voltage $\Delta U$ so generated by the two elements 35, 36 and angular displacements $\Delta \varphi$ of circle 1a about shaft 13, relative to mark 34. At a zero position shown by a broken vertical line the voltage is zero as mentioned. It will be seen that the system described provides an electrical measurement for determination or regulation of relative positions between the different circles.

With respect to the mechanism for such determination and control, reference is made to Figure 2 once more. It will be seen that circle 1a by means of shaft 13, is rigidly connected with master circle 2a, for angular repositioning together therewith. By contrast master circle 3a is stationary, being mounted by holder 40 on sleeve 41 which at 42 is rigidly secured to the inside of housing 43 for both master circles. Shaft 13 is rigid with worm gear 44 which is connected with worm 45 for actuation by shaft 46 journaled at 46' and driven by motor 47 in order to reposition test circle 1a and master circle 2a in a way to be discussed hereinafter.

For the scanning of divisions on circles 2a and 3a there is provided a device generally designated by numeral 50 and which comprises a frame pivoted about shaft 13 and sleeve 41 by upper ball bearing means 51, 51' and lower ball bearing means 52, 52' respectively. Frame 50 is fast on worm gear 53 which is driven by a worm, not to be seen in the figure; the worm being secured to shaft 54 journaled at 55 and actuated by synchronous motor 56. A first part of the scanning instrumentation in frame 50 comprises a light source 60, point aperture member 61 and prism 62 for illuminating graduations on circle 2a in a way similar to that shown as to circle 1a in Figure 3. Similarly the images of graduation marks on circle 2a are received via prism 63, optical system 65 and suitably shaped diaphragm 66, in photosensitive element 67, which furnishes the scanning impulse. The same illuminating system 60 to 62 also illuminates the second master circle 3a, whereas a separate receiving segment 64 is provided for the second master scan, which desirably is similar to or identical with instruments 63 to 67 in order to provide identical scanning; the two master scanners being held in rigid synchronism by frame 50.

Said frame is shown as also providing additional scanning means 70, similar to the combined system 60 to 67. Such additional scanning means is advantageously provided for the reason that test circles and accordingly master circles may have to vary in certain respects. Variation of circle diameter of test circles is not necessarily reflected in the master circles, but the latter circles may differ in other respects, for instance in respect of the basic division system applied thereto. In modern practice much reference is made to decimal circle divisions or "grades," in lieu of the sexagesimal division into 360 degrees. Thus it is preferred that both master circles have decimal and sexagesimal markings; and in order to avoid mutual disturbance of such markings, they are best disposed on different radii of the circles. Thus it will be seen that the new machine is capable of examining a great variety of test circles, without interchange of master circles.

The illuminating and photosensitive devices as well as the motors shown in Figure 2 are of course associated with conductors and circuit controls. As such conductors and controls are invisible in Figure 2, they are schematically shown in Figures 4 to 7.

Figure 4 also shows mechanical elements of the machine which, although not essential in a broad sense, are desirably added in order to adapt the machine to either of the two procedural methods described above, among others. Schematically, the figure shows illuminating device 16 for test circle 1a below this circle, rather than above, and it will be noted that the master circles are not shown in this figure. Between scanning receiver 19 and test circle area 1' there is provided an optical micrometer, formed in a way known by itself by plane-parallel glass plate 71, rotatable into different inclinations relative to the circle. Rotation of the plate is achieved by shaft 73, driven by motor 75 and oriented radially of the circle. A similar micrometer 72 and drive system 74, 76 are provided for the opposite scanning receiver 18.

This arrangement is particularly useful when practicing the first of the two testing methods described above, wherein the test circle is repositioned with consideration of the phase difference between the pulses of the first and second master scanning devices, 67 and 64 of Figure 2. Let is be assumed for instance that test circle 1a is in a position, in Figure 4, wherein said master pulses have phase difference zero. The test circle mark observed by system 17, 18 is then displaced relative to reference mark 34, Figure 3A, by an amount the quantitative extent of which can be determined by micrometer 72.

For automatic performance of this determination, micrometer shaft 74 is rotated by its motor 76, through reducing gear 77, until the test circle scanning signal 85, as well as the previously mentioned master scanning signal, is zero, said signal 85 being schematically shown in Figure 4. It will be understood that visual inspection through microscope 20, Figure 2, then shows the reestablished appearance of Figure 3A.

The number of rotations performed by motor 76 in the zero process just described is proportional to the spacing error of the graduation mark under observation. By means of this fact there is provided a convenient digital signal, which can be used for added functions of the testing process, as will be described presently. First however it may be noted that signal 85 of test circle scanner 18 provides the input of a regulating device 87 for suitably controlling motor 76, that is, for energizing said motor so long as the signal is otherwise than zero. In exactly the same way micrometer 71 of the second test circle reading position 16, 19 is operated with the aid of reducing gear 78, signal 84 and regulating device 86.

Referring now to the utilization of the number of revolutions performed by motor 75, 76, these numbers are primarily counted individually in counters 79 and 80 respectively and are then added to one another by adding counter 83, actuated from individual counters 79, 80 by linkage 81, 82. Thus there appears at the center of adding counter 83 the sum of spacing errors observed on two sides of the test circle at one time. Such a sum $(dn)$, as mentioned before, is proportional to the diametric error of the pair of markings under observation. Advantageously this sum is registered after each observation, by a recorder 83', whereupon the test circle is repositioned together with the first master circle 2a, Figure 2, by motor 47 which for this purpose is controlled by the phase measuring device to be discussed hereinafter with reference to Figure 6. Figure 4 merely indicates, in a schematic way, a device 4A for initiating in suitable cycles operations of motor 47 and a device 4B controlled by the output of the phase measuring system and stopping motor 47. As the duration of the time interval required for optical micrometer adjustment 71, 72 depends on variable spacing errors, starting control 4A is advantageously influenced by adding counter 83, as suggested at 4C. Thus it becomes possible to rapidly and automatically determine and record spacing errors of all markings on the test circle.

Although the system of Figure 4 and the operation thereof as described has great advantages as compared with the methods used until now it has a disadvantage in that the digital measurements furnished by adding counter 83 cannot be directly interpreted in terms of dimensions of spacing errors or diametrical errors, for the reason that the proportionality between spacing at 1' and indication at 83 is dependent not only for reading optics 17 and gear characteristics 77 but also from the radius of division 1a. Figure 5 shows a system which is independent from the latter value as well as from other limitations and which is also illustrated in a somewhat more realistic way as to arrangement of optical parts.

Optical micrometer plates 90, 91 are here interposed between illuminator 16, 17 and test circle 1a and one of them, 91, is driven directly by shaft 94 of motor 95, said shaft being journaled at 93, whereas the other, 90, is rotated in the opposite direction by a shaft 92 journaled at 93'; the counter rotation being provided by a suitable mechanism 96 driven by the same motor 95. Accordingly, when plane-parallel plate 90 is rotated in one direction through a certain angle, plate 91 is rotated through the same angle in the opposite direction. Actuating motor 95, effecting both inclinations, is so controlled by output signals 97, 98 of scanners 18, 19, with the aid of regulator 99, that the sum of the spacing errors of both reading positions 18, 19 becomes zero. It will readily be seen that in order to achieve this it is also necessary to reposition circle 1a by cerain amounts, dependent on each error distribution reflected at 97, 98. For such repositioning of the test circle there is provided regulator 100 in circuit with micrometer motor regulator 99, this regulator 100 being adapted to suitably actuate the aforementioned motor 47 for shifting the test circle together with the first master circle. Afer as well as during and before such shifting, the scanning of the two master circles continues. It will be seen that, at the end of the automatic positioning of test circle 1a and of the first master circle, a phase difference again exists between the first and second master circles.

For measuring the phase differences mentioned, there can be used basically known devices, one of which is shown in Figure 6 for the sake of completeness, particularly for a more complete showing of how the phase shift between the master circle pulses can be utilized for measuring and recording purposes. The circuit of Figure 6, except as it includes photocell 67, 64 and motor 47, represents a detail view of block 4A in Figure 4. Conductors 101, 102 feed the output of scanners 67, 64 via pulse duration modulators 103, 104 to the control grids of pentodes or the like, generally shown at 105, 106, respectively; modulators 103, 104 being provided in order to secure for the phase shift circuit a pulse input having sufficient duration or width, for instance to lengthen such pulses. Impedances 107, 108 are in series between the anodes of tubes 105, 106 and in parallel with a condenser 109. The proportioning of components is such that the zone of critical plate potential of the characteristic curve of the pentodes is utilized.

Briefly, this utilization involves that, when an impulse voltage appears at 101, anode current occurs which is almost constant from the time during which said impulse voltage is built up and which further continues during the existence of such voltage, while condenser voltage is built up at 109. Thus there is created a potential gradient at impedance 107 which is constant during a certain interval and which charges condenser 109. The second impulse arrives with phase shift at 102 providing a similar control voltage for pentode 106 and a similar constant voltage gradient at impedance 108 the magnitude of which equals that existing at 107, as the symmetrically arranged components are uniformly dimensioned and designed. As a result an actual voltage prevails on condenser 109 only during the time interval which corresponds with the phase difference of pulses arriving at 101, 102.

This net condenser voltage is utilized with the aid of a time switch 110 which interrupts anode current at all times when pentode 105 still furnishes full anode current and when voltage has already appeared at 108. As such times condenser 109 can discharge through resistor 111, 112; discharge via impedances 107, 108 is prevented by diodes 140, 141. While the measuring process is periodic, having a frequency dependent on the moving and counting speeds of scanning system 50, the condenser discharging components 111, 112 have an average discharge current flowing therein the amperage of which is independent of such periodicity; and such amperage—or equivalent current characteristic—is measured by a suitable instrument 113 in series with components 111, 112. Advantageously the phase difference of interest in connection with the above described methods is recorded, for instance printed, at a suitable point 113′. In addition the output of system 111, 112, 113 can be utilized via suitable regulator means 113″ for the control of motor 47 which intermittently shifts the test circle and first master circle.

A modified phase measuring circuit is shown in Figure 7 wherein the pulse from one of the scanners, 67, reaches the corresponding pentode 123 via phase shifting unit 122 whereas the other pulse reaches the corresponding pentode 124 direct. Said pentodes form parts of amplifier systems 125, 126 which operate selectively and filter the fundamental frequencies out of the two pulses whereupon such pulses, after multiplication in mixer 127, are fed to integrating circuit 128 for providing at 129 an indication which is proportional to the phase shift of pulses 120, 121 from scanner 63, 64. The indication at 129 can be utilized in various desired ways, for instance, upon amplification in a magnetic amplifier 130, for controlling motor 47.

It will be seen that the new method and instrumentation, while including an apparent complication by the utilization of two master circles rather than one, provide substantial improvements in the difficult art of testing measuring circles. In lieu of human spot testing, subject to extreme fatigue and uncertainty, comprehensive automatic testing is provided, and even to such extent as the testing is still performed by human operators, for instance by observation at 20, 21, Figure 2, the routine has been improved materially, as it now substantially depends only on yes-no determinations of coincidence positions, without laborious readings or estimations of different distances. Critical for the quality of the test is no longer the fatigue resistance and/or measuring speed of the observer but only the quality of the optical, mechanical and electronic instrumentation, including particularly the optics shown in Figure 3 and the corresponding optics applied to the two master circles. For these in turn it is most essential how precise and how truly identical the master circles are with respect to their graduations; in these respects it is preferred to utilize master circles which are either copies of a single primary master or of which one is a reproduction of the other.

Furthermore it will now be understood that it is basically desirable according to the present invention that the master circle divisions be sufficiently fine to furnish the greatest possible number of division intervals and corresponding impulses, constituting integral multiples of the divisions of test circle 1—a requirement which differs materially from practices hitherto followed, wherein multiple master subdivisions would have led to confusion rather than simplification. According to the invention, wherein two master divisions are used rather than merely one and wherein their markings are counted rather than measured, the situation is significantly different from that existing in prior practice. It may however be noted that in lieu of multiple subdivisions of each master circle there can be used multiple scanners of a single, relatively coarse subdivision of each master, such scanners being so disposed about the periphery of the master circles that the impulses created thereby do not coincide in time so that they follow one another in a predetermined cycle.

Numerous additional modifications of the invention are possible. For instance, master circle measurements, obtained according to the invention, can be used as controlling impulses, in the fabrication of test circle divisions, by utilizing in the test circle illuminating device 17 of Figure 2 a graduation projecting device; the test circle is then being provided with a photosensitive layer thereon. Still other modifications are possible.

I claim:

1. In a machine for testing graduated circles such as those required in precision theodolites and the like: first and second graduated master circles; support means for rigidly interconnecting the circle being tested with the first graduated master circle; means for angularly positioning and repositioning said support means, circle and first master circle; means independently supporting the second graduated master circle; and means movable relative to both master circles for scanning graduations thereof, for thereby generating first and second cycles of impulses; and means for measuring functions of positions on the circle being tested, with the aid of determinations of the relative phases of said first and second cycles of impulses.

2. Apparatus as described in claim 1 additionally comprising scanning means associated with the support means of the circle being tested and adapted to automatically influence the operation of said measuring means.

3. In a circle testing machine: support means for coaxially and rigidly interconnecting a graduated circle to be tested and a first master-graduated circle; frame means coaxial with said support means for holding a second master-graduated circle; graduation reading means for each circle, at least each graduation reading means for a master circle being adapted to furnish a cycle of electrical impulses, one impulse when passing each graduation of the respectve circle; means for rotating the graduation reading means for the master circles, in rigid connection one with the other, and relative to said master circles;

and means for translating relative phase positions of the two cycles of impulses, derived from the two master circles, into measurements of graduation errors of the circle to be tested, with the aid of the rigid interconnection of such circle with the first master-graduated circle.

4. Apparatus as described in claim 3, additionally including an optical micrometer in the line of sight of the graduation reading device for the circle to be tested; means for turning said micrometer so as to zero any error reading in said graduation reading device for the circle to be tested; means controlled by the graduation reading means for the circle to be tested and adapted to automatically operate the means for turning the optical micrometer; and means adapted to respond to the operation of said turning means and to said cycles of electrical impulses, incident to said measurements.

5. Apparatus as described in claim 3 wherein at least one of the graduation reading means comprises: means for illuminating a graduated portion of the respective circle, for forming an image thereof; means for splitting the image into a pair of image portions; and means for photoelectrically comparing the light fluxes of such image portions.

6. Apparatus as described in claim 5 wherein the means adapted to perform the photoelectric comparison is also adapted automatically to reposition circle to be tested and the first master-graduated circle to vary one of said cycles, for purposes of said measurements of graduating errors.

7. Apparatus according to claim 5 wherein the image splitting system is associated with the circle to be tested, the apparatus including means, controlled by the image splitting system to move in response to different light fluxes of the separated image portions, and thereby optically to shift said image of the graduated portion of the circle to be tested.

8. Apparatus according to claim 3, wherein the first and second master-graduated circles are copies of a single primary master circle.

9. Apparatus according to claim 3, wherein one of the first and second master-graduated circles is a photographic copy of the other.

10. Apparatus according to claim 3 wherein the translating means includes means for averaging intervals between the cyclic impulses.

11. Apparatus according to claim 3 including means for automatically intermittently repositioning the circle to be tested together with the first master-graduated circle, relative to the second master circle, so that phase differences of said cycles of impulses are kept to a fixed value such as zero.

12. Apparatus as described in claim 11 including means for automatically observing values of erroneous spacing of graduations of the circle to be tested, and means for adding a plurality of such values, in each position of the circle to be tested, for recording spacing errors of said circle.

13. Apparatus as described in claim 3 wherein the master-graduated circles are relatively coarsely graduated, the apparatus including a plurality of means for simultaneously scanning each master-graduated circle at different angular positions; said graduation reading means of the master-graduated circles being distributed over said several scanning means.

References Cited in the file of this patent

UNITED STATES PATENTS

| | | |
|---|---|---|
| 2,251,828 | Hammond | Aug. 5, 1941 |
| 2,508,547 | Slonczewski | May 23, 1950 |
| 2,795,992 | Tao | June 18, 1957 |

FOREIGN PATENTS

| | | |
|---|---|---|
| 900,149 | Germany | Dec. 21, 1953 |
| 916,229 | Germany | Aug. 5, 1954 |
| 931,805 | Germany | Aug. 18, 1955 |
| 950,096 | Germany | Oct. 4, 1956 |